(12) United States Patent
Hillier et al.

(10) Patent No.: US 7,922,788 B2
(45) Date of Patent: Apr. 12, 2011

(54) PROCESS FOR RECOVERING GOLD AND SILVER FROM REFRACTORY ORES

(75) Inventors: Daniel Hillier, Oakville (CA); Barun Gorain, Toronto (CA); Jacques McMullen, Oakville (CA)

(73) Assignee: Barrick Gold Corporation, Toronto (CA)

( * ) Notice: Subject to any disclaimer, the term of this patent is extended or adjusted under 35 U.S.C. 154(b) by 143 days.

(21) Appl. No.: 12/208,968

(22) Filed: Sep. 11, 2008

(65) Prior Publication Data

US 2009/0074607 A1    Mar. 19, 2009

Related U.S. Application Data

(60) Provisional application No. 60/973,364, filed on Sep. 18, 2007, provisional application No. 61/026,361, filed on Feb. 5, 2008, provisional application No. 61/026,364, filed on Feb. 5, 2008.

(51) Int. Cl.
  *C22B 3/00* (2006.01)
  *B03D 1/001* (2006.01)
  *C25C 5/02* (2006.01)

(52) U.S. Cl. ............. 75/711; 205/571; 423/26; 209/164

(58) Field of Classification Search .................. 75/711; 205/571; 423/26; 209/164
See application file for complete search history.

(56) References Cited

U.S. PATENT DOCUMENTS

| | | |
|---|---|---|
| 3,799,334 A | 3/1974 | Collins |
| 3,819,363 A | 6/1974 | Wanzenberg |
| 3,968,032 A | 7/1976 | Menendez et al. |
| 4,058,897 A | 11/1977 | Edwards |
| 4,138,248 A | 2/1979 | Narain |
| 4,177,068 A | 12/1979 | Balakrishnan et al. |
| 4,270,609 A | 6/1981 | Choules |
| 4,314,890 A | 2/1982 | Beck et al. |
| 4,337,226 A | 6/1982 | Peasley et al. |
| 4,397,686 A | 8/1983 | Winkler et al. |
| 4,423,011 A | 12/1983 | Baglin et al. |
| 4,566,772 A | 1/1986 | Sulesky et al. |
| 4,786,323 A | 11/1988 | Gock et al. |
| 4,867,868 A | 9/1989 | Miller et al. |
| 4,911,804 A | 3/1990 | Dickson |
| 4,925,923 A | 5/1990 | Yalpani et al. |
| 4,986,360 A | 1/1991 | Laky et al. |
| 4,994,243 A | 2/1991 | Goldstone et al. |
| 5,034,055 A | 7/1991 | Rowson |
| 5,078,977 A | 1/1992 | Mudder et al. |

(Continued)

FOREIGN PATENT DOCUMENTS

CA    2070087    12/1992

(Continued)

OTHER PUBLICATIONS

Pyke, B.L. et al. "The Characterisation and Behavior of Carbonaceous Material in a Refractory Gold Bearing Ore." Minerals Engineering, vol. 12, No. 8. pp. 851-862. 1999.*

(Continued)

*Primary Examiner* — George Wyszomierski
*Assistant Examiner* — Tima M McGuthry-Banks
(74) *Attorney, Agent, or Firm* — Sheridan Ross P.C.

(57) ABSTRACT

The present invention is directed to flotation of refractory gold sulfide ores in which the ore is ground, floated, the tailings reground, and refloated to produce gold-bearing concentrates.

26 Claims, 8 Drawing Sheets

U.S. PATENT DOCUMENTS

| | | | |
|---|---|---|---|
| 5,087,269 | A | 2/1992 | Cha et al. |
| 5,254,153 | A | 10/1993 | Mudder |
| 5,262,048 | A | 11/1993 | Zimmerman et al. |
| 5,364,605 | A | 11/1994 | Pfeffer et al. |
| 5,411,575 | A | 5/1995 | Fleming et al. |
| 5,423,991 | A | 6/1995 | Zimmerman et al. |
| 5,629,137 | A | 5/1997 | Leedy |
| 5,654,127 | A | 8/1997 | Leedy |
| 5,654,204 | A | 8/1997 | Anderson |
| 5,675,060 | A | 10/1997 | Benoist et al. |
| 5,725,995 | A | 3/1998 | Leedy |
| 5,743,936 | A | 4/1998 | Yokoyama et al. |
| 5,753,104 | A * | 5/1998 | Hoecker et al. ............... 209/167 |
| 5,834,294 | A | 11/1998 | Brierley et al. |
| 5,834,838 | A | 11/1998 | Anderson |
| 5,837,210 | A * | 11/1998 | Simmons et al. ............... 423/26 |
| 5,851,499 | A | 12/1998 | Gathje et al. |
| 5,909,022 | A | 6/1999 | Bourke et al. |
| 5,939,034 | A | 8/1999 | Virnig et al. |
| 5,968,364 | A | 10/1999 | Virnig et al. |
| 5,985,221 | A | 11/1999 | Knecht |
| 6,011,404 | A | 1/2000 | Ma et al. |
| 6,041,941 | A | 3/2000 | Newell et al. |
| 6,092,666 | A | 7/2000 | Clark et al. |
| 6,131,835 | A | 10/2000 | Johnson |
| 6,131,836 | A | 10/2000 | Johnson |
| 6,197,214 | B1 | 3/2001 | Virnig et al. |
| 6,200,545 | B1 | 3/2001 | Dreisinger |
| 6,210,648 | B1 | 4/2001 | Gathje et al. |
| 6,251,163 | B1 | 6/2001 | King |
| 6,260,549 | B1 | 7/2001 | Sosiak |
| 6,310,034 | B1 | 10/2001 | Woychik et al. |
| 6,318,361 | B1 | 11/2001 | Sosiak |
| 6,325,062 | B1 | 12/2001 | Sosiak |
| 6,383,458 | B1 | 5/2002 | Brierley et al. |
| 6,414,509 | B1 | 7/2002 | Bhatt et al. |
| 6,425,392 | B1 | 7/2002 | Sosiak |
| 6,471,743 | B1 | 10/2002 | Young et al. |
| 6,482,373 | B1 | 11/2002 | Hannaford et al. |
| 6,537,747 | B1 | 3/2003 | Mills, Jr. et al. |
| 6,574,130 | B2 | 6/2003 | Sega et al. |
| 6,613,271 | B1 | 9/2003 | Lewis-Gray |
| 6,641,642 | B2 | 11/2003 | Simmons et al. |
| 6,643,165 | B2 | 11/2003 | Segal et al. |
| 6,647,250 | B1 | 11/2003 | Bultman et al. |
| 6,660,059 | B2 | 12/2003 | Ji et al. |
| 6,676,909 | B2 | 1/2004 | Marsden et al. |
| 6,679,383 | B2 | 1/2004 | Gathje et al. |
| 6,696,283 | B1 | 2/2004 | Brierley et al. |
| 6,706,402 | B2 | 3/2004 | Rueckes et al. |
| 6,784,028 | B2 | 8/2004 | Rueckes et al. |
| 6,828,351 | B2 | 12/2004 | Epstein et al. |
| 6,835,591 | B2 | 12/2004 | Rueckes et al. |
| 6,836,424 | B2 | 12/2004 | Segal et al. |
| 6,896,808 | B1 | 5/2005 | Jay |
| 6,911,682 | B2 | 6/2005 | Rueckes et al. |
| 6,919,592 | B2 | 7/2005 | Segal et al. |
| 6,942,921 | B2 | 9/2005 | Rueckes et al. |
| 6,953,120 | B2 | 10/2005 | Deveau et al. |
| 6,979,590 | B2 | 12/2005 | Rueckes et al. |
| 7,018,951 | B2 | 3/2006 | Gaffney et al. |
| 7,049,466 | B2 | 5/2006 | Bogan, Jr. et al. |
| 7,053,022 | B2 | 5/2006 | Gaffney et al. |
| 7,056,758 | B2 | 6/2006 | Segal et al. |
| 7,066,983 | B2 | 6/2006 | Ji et al. |
| 7,087,797 | B2 | 8/2006 | Sielcken et al. |
| 7,120,047 | B2 | 10/2006 | Segal et al. |
| 7,176,505 | B2 | 2/2007 | Rueckes et al. |
| 7,219,804 | B2 | 5/2007 | Simmons et al. |
| 7,229,560 | B2 | 6/2007 | Rink et al. |
| 7,244,769 | B2 | 7/2007 | Epstein et al. |
| 2002/0041882 | A1 | 4/2002 | Guerin-Marchand et al. |
| 2002/0044899 | A1 | 4/2002 | Marsden et al. |
| 2003/0004209 | A1 | 1/2003 | Hunter et al. |
| 2003/0075021 | A1 | 4/2003 | Young et al. |
| 2003/0104400 | A1 | 6/2003 | Ruben et al. |
| 2004/0146438 | A1 | 7/2004 | Marsden et al. |
| 2006/0133974 | A1 | 6/2006 | Ji et al. |
| 2006/0142634 | A1 | 6/2006 | Anstadt et al. |
| 2006/0185475 | A1 | 8/2006 | Hourn et al. |
| 2006/0234260 | A1 | 10/2006 | Griffais et al. |
| 2009/0071295 | A1 * | 3/2009 | Gorain et al. ............... 75/710 |
| 2009/0071296 | A1 | 3/2009 | Hillier et al. |

FOREIGN PATENT DOCUMENTS

| | | |
|---|---|---|
| CA | 2095307 | 4/1993 |
| CA | 2129819 | 8/1993 |
| CA | 2138618 | 7/1995 |
| CA | 2264865 | 4/1998 |
| CA | 2321703 | 9/1999 |
| CA | 2349940 | 3/2000 |
| CA | 2363031 | 8/2000 |
| CA | 2278043 | 1/2001 |
| CA | 2278044 | 1/2001 |
| CA | 2417417 | 1/2002 |
| CA | 2504934 | 5/2004 |
| CA | 2272037 | 7/2009 |
| CN | 86101940 | 4/1987 |
| CN | 1052903 | 7/1991 |
| CN | 1253845 | 5/2000 |
| CN | 2405636 | 11/2000 |
| CN | 1544169 | 11/2004 |
| CN | 1800421 | 7/2006 |
| CN | 1800423 | 7/2006 |
| DE | 3036848 | 4/1982 |
| EP | 0614089 | 9/1994 |
| EP | 0686206 | 5/1995 |
| EP | 1441048 | 7/2004 |
| GR | 1001483 | 2/1994 |
| KR | 2050046 | 6/2002 |
| KR | 2077054 | 10/2002 |
| KR | 20030041841 | 5/2003 |
| KR | 5002690 | 1/2005 |
| MX | 3000745 | 11/2004 |
| NZ | 506858 | 9/2002 |
| RU | 2104321 | 2/1998 |
| RU | 2135297 | 8/1999 |
| TW | 528732 | 4/2003 |
| WO | WO 95/12001 | 5/1995 |
| WO | WO 95/32285 | 11/1995 |
| WO | WO 99/47714 | 9/1999 |
| WO | WO 00/48944 | 8/2000 |
| WO | WO 00/65112 | 11/2000 |
| WO | WO 01/69862 | 9/2001 |
| WO | WO 02/08475 | 1/2002 |
| WO | WO 2004/042094 | 5/2004 |
| WO | WO 2004/067751 | 8/2004 |
| WO | WO 2004/069166 | 8/2004 |

OTHER PUBLICATIONS

Author Unknown, "Positive Results for Initial Metallurgical Testwork from the Akanani Platinum Project", Press Release-Afriore Limited, Jun. 28, 2006, pp. 1-2.

Wills, Mineral Processing Technology: An Introduction to the Practical Aspects of Ore Treatment and Mineral Recovery, 1979, vol. 29, Chapter 12, pp. 276-337.

Bourke, "Flash Flotation of Copper and Gold", Microsoft PowerPoint—OutputV3 international, Issue 3, Sep. 2002, pp. 7-11, available at ttp://64.233.167.104/search?q=cache:qRzNN7-cECcJ:www.outec.com/files/Technology/Documents/newsletters/Output3_int..., printed on Aug. 18, 2007.

"Depramin® in Flotation", available at http://www.cs.akzonobel.com/Products/Depramin/inFlotation/, as early as Nov. 15, 2004, p. 1, printed on Aug. 18, 2007.

King, "Audit the Hidden Costs of Inefficient Thickness", Microsoft PowerPoint—OutputV3 international, Issue 3, Sep. 2002, pp. 12-17, available at ttp://64.233.167.104/search?q=cache:qRzNN7-cECcJ:www.outec.com/files/Technology/Documents/newsletters/Output3_int..., printed on Aug. 18, 2007.

Okley, "Collaborative Research: how should it sharpen your own competitive edge?", Microsoft PowerPoint—OutputV3 international, Issue 3, Sep. 2002, pp. 1-6, available at http://64.233.167.104/search?q=cache:qRzNN7-cECcJ:www.outec.com/files/Technology/Documents/newsletters/Output3_int..., printed on Aug. 18, 2007.

Yan, et al., "Predicting the Performance of a Flotation Circuit that Incorporates Flash Flotation", Conference Proceeding—Centenary of Flotation Symposium, 2005, available at http://www.shop.ausimm.com.au/paperdetails.php?PaperID=1914, pp. 1-2, printed on Aug. 18, 2007 (Abstract Only).

International Search Report for International (PCT) Application No. PCT/IB2008/003584, mailed May 11, 2009.

Written Opinion for International (PCT) Application No. PCT/IB2008/003584, mailed May 11, 2009.

"Blue Ridge Platinum Concentrator handed over," Bateman Globe 78, 4th Quarter, 2009, pp. 6-7.

Official Action for Pakistan Patent Application No. 1094/2008, dated Nov. 9, 2009.

Official Action for Pakistan Patent Application No. 1094/2008, dated Mar. 4, 2010.

Official Action for Pakistan Patent Application No. 1094/2008, dated May 14, 2010.

* cited by examiner

US 7,922,788 B2

PROCESS FOR RECOVERING GOLD AND SILVER FROM REFRACTORY ORES

CROSS REFERENCE TO RELATED APPLICATION

The present application claims the benefits of U.S. Provisional Application Ser. Nos. 60/973,364, filed Sep. 18, 2007; 61/026,361, filed Feb. 5, 2008, and 61/026,364, filed Feb. 5, 2008, all of which are entitled "Process for Recovering Gold and/or Silver from Refractory Ores", each of which is incorporated herein by this reference in its entirety.

FIELD OF THE INVENTION

The inventions herein relate generally to recovery of gold, silver or both from refractory materials and particularly to recovery of gold, silver, or both from refractory sulfide and/or preg robbing ores, concentrates, and tailings.

BACKGROUND OF THE INVENTION

Gold ores are treated by a variety of processes. All hydrometallurgical gold recovery processes rely on leaching relatively low concentrations of gold from ores using lixiviants, primarily cyanide solutions. Gold recovery from many ores by cyanide leaching is ineffective, with as little as 30 percent of the gold content of the ore being removed. These ores are called refractory ores. Poor gold recovery from refractory ores is typically caused by the gold being occluded in sulfide mineral grains (usually pyrite and arsenopyrite grains) so that the gold cannot react with the cyanide leach solution or by cyanide-dissolved gold being adsorbed by carbonaceous material present in the ore (this phenomenon is known as "preg robbing"). Ores having both problems are known as double refractory ores.

A common method of treating refractory gold ores to render the gold recoverable by cyanidation is by pressure oxidation in autoclaves. Pressure oxidation oxidizes sulfide minerals, rendering the residue non-refractory. The gold is then dissolved by cyanidation and concentrated by adsorption onto activated carbon or resin (either in adsorption columns or in carbon added to the leaching process (known as Carbon-In-Leach ("CIL"), Resin-In-leach ("RIL"), or Carbon-In-Pulp ("CIP") techniques). The adsorbed gold is eluted from the loaded carbon or resin by stripping with ammonia, nitric acid, caustic and/or steam. The gold is then converted to a solid from the eluate by electrowinning, precipitation and filtration, or cementation.

To reduce process operating and capital costs and/or enable autogenous autoclave operation, it is desirable to concentrate ores by suitable techniques, particularly froth flotation. Froth flotation uses differences in physico-chemical surface properties of particles to float various minerals. After treatment with reagents, such differences in surface properties between the minerals within the flotation pulp are emphasized as either hydrophobic (water repelling)/aerophillic (air attracting) on the one hand or hydrophilic (water attracting)/aerophobic (air repelling) on the other. Air bubbles sparged through the pulp attach to and float hydrophobic particles. Because autogenous autoclave operation commonly requires a sulfide sulfur concentration in the autoclave feed of at least 6.5 wt. %, flotation reagents and conditions are selected to favor flotation of selected gold bearing sulfide minerals.

A conventional flotation circuit for refractory gold ores is shown in FIG. 1. The feed material 100, including gold bearing sulfides, is ground in comminution circuit 104 to provide a comminuted material having a particle size selected to liberate gold and sulfides containing gold. The comminuted material is conditioned with selected reagents (e.g., collectors, frothers, and regulators) and floated in a primary rougher flotation circuit 108 to form a rougher flotation concentrate 116. The primary rougher tails may be floated in a secondary rougher flotation circuit 112 to provide a secondary rougher concentrate 116. The secondary rougher tails are then floated in a first scavenger flotation circuit 120 and the first scavenger tails in an optional second scavenger flotation circuit 124 to provide final scavenger tails 144. The concentrates from the first and second scavenger flotation circuits 120 and 124 are floated in first and (optional) second scavenger cleaner flotation circuits 128 and 136 to provide scavenger cleaner concentrate 132 and scavenger cleaner tails 140.

Flotation of refractory gold-bearing sulfide ores can be challenging for a number of reasons. Gold bearing sulfide ores are commonly fine grained, thereby requiring a finer grind for liberation. Finer grinding can lead to undesirable results. Fine grinding can cause oxidation of sulfides, particularly arsenopyrite, resulting in poor flotation performance. Finer grinding can generate ultrafines (known as slimes), which are difficult to float selectively. Gold-bearing sulfides, such as arsenopyrite, have a high specific gravity and can accentuate the sliming problems during classification. Finer grinding can liberate carbonaceous matter and other deleterious gangue minerals, thereby resulting in significantly higher reagent consumption and inhibiting sulfide mineral flotation. Carbonates present in many gold ores can cause gypsum formation and precipitation on the mineral surfaces of the particles. Gypsum deposits can adversely impact the ability of collectors to adsorb to the surfaces. Flotation selectivity of ultra fine mineral species can be challenging.

SUMMARY OF THE INVENTION

These and other needs are addressed by the various embodiments and configurations of the present inventions. The present invention is directed to flotation of refractory and double refractory ores.

In a first embodiment, a method includes the steps of:
 (a) providing a refractory gold-bearing sulfide ore
 (b) comminuting the material to form a feed material with a primary size distribution;
 (c) floating the feed material to form first concentrate and tailings fractions;
 (d) comminuting the first tails fraction to provide comminuted tailings, the comminuted tailings having a second size distribution finer than the primary size distribution; and
 (e) further floating the comminuted tailings to produce second concentrate and tailings fractions, the second concentrate fraction including most of the gold and sulfides in the first tails fraction.

The refractory gold sulfide-containing material can be in any form, such as ore, concentrate, tailings, calcine, matte, slag, and other derivatives of metallurgical processes. The material may contain recoverable amounts of silver.

The Mill-Chemistry Control-Flotation/Mill-Chemistry Control-Flotation or MCF2, process, employed by a preferred configuration of this embodiment, can realize high gold and/or silver recoveries. It controls mineral liberation, classification, and flotation chemistry in various stages and can provide effective, selective flotation of gold, silver, and gold and silver-bearing sulfide ores and a more robust flotation process. The MCF2 process can require multiple stages to concentrate gold and/or silver ores effectively. The process can prepare mineral surfaces and provide proper flotation conditions substantially maximizing flotation performance while inhibiting sliming (over grinding) and oxidation and/or dissolution of deleterious metal ions.

Liberation is controlled in multiple stages. In a first flotation stage, the liberated coarse and fast-floating particles are floated. The non-liberated slower-floating particles in the tails are reground to increase liberation followed by a second stage of flotation. Controlling liberation in multiple stages can reduce over-grinding, thus reducing slime generation, and increase the chances of selectively recovering gold-bearing sulfides. It has been found that coarse-grained liberated minerals are typically fast-floating whereas the fine-grained minerals are slow floating. Commonly, the coarse-grained minerals are liberated at a $P_{80}$ size ranging from about 100 to about 200 microns, and the fine-grained minerals are liberated at a $P_{80}$ size ranging from about 25 to about 100 microns.

Controlling particle size using classification can provide, to the primary and secondary flotation circuits, a feed material having a relatively narrow size distribution.

Control of chemistry is normally required during and/or after every grinding stage. Factors to be considered in chemistry control include galvanic interaction due to release of iron from grind media/mill shell, the presence, in the flotation pulp, of other mill soluble ions from the ore, and the impact of pH and Eh on the flotation system. Controlling the solution chemistry normally requires proper selection of mill liners, grinding media, and recycle water requirements, addition of sulfide activators (such as $CuSO_4$), and adjustment of pH and Eh to selectively float sulfides while suppressing flotation of silicates and other non-sulfide minerals.

Control of grinding, classification and chemistry in stages is a highly beneficial aspect of certain embodiments of this invention.

When carbonaceous, or preg robbing, matter is present, its pre-flotation or depression is desirable, such as by addition of a suitable carbon depressant. Some carbon depressants can significantly reduce the required dosages of collectors and frothers, which otherwise react with carbon-containing minerals. Collectors and frothers are selected to provide an optimum flotation chemistry. In some cases, sulfidization may be needed to address oxidized or tarnished ores. Dispersants or modifiers may be required in cases where a significant amount of clays or slimes are present in the system.

Stage-wise control of liberation, classification and chemistry is preferably performed as an integrated approach to optimize flotation operation. Controlling these flotation system parameters in one step seldom provides the proper conditions for optimum flotation performance. Too many stages, however, can be uneconomical, as the additional recovery may produce only a marginal or sub-marginal return. Two stages are preferred, but, in some cases, three or more stages may be employed.

These and other advantages will be apparent from the disclosure of the invention(s) contained herein.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

Process Overview

Figure 1:
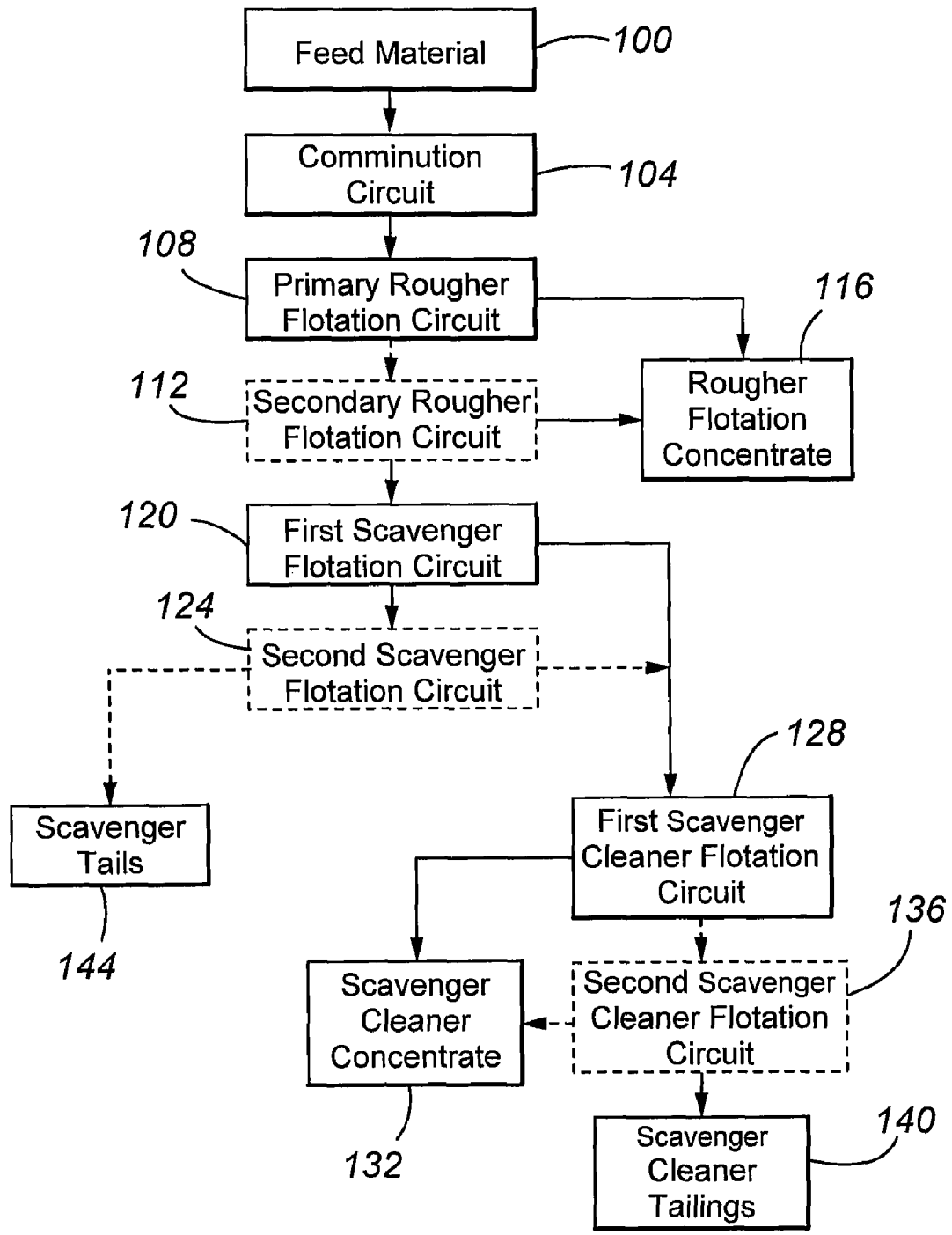
FIG. 1 is a flowchart of a conventional sulfide flotation process.

The present invention can provide a gold and/or silver concentration process that is particularly applicable to refractory and double refractory gold and silver-bearing sulfide materials. A common refractory material includes about 0.1 wt. % or more sulfide sulfur and even more preferably from about 0.5 to about 15 wt. % sulfide sulfur, about 0.05 oz/tonne or more and even more commonly from about 0.2 to about 2.0 oz/tonne gold, about 1 oz/tonne or more and even more commonly from about 1 to about 5 oz/tonne silver, and from about 0.3 to about 10 wt. % organic carbonaceous materials (which may be preg robbing). The material commonly has no more than about 1 oz/tonne platinum group metals. Sulfide minerals in material 200 commonly include pyrite, marcasite, arsenopyrite, and chalcopyrite.

The MCF2 Process

An embodiment of the MCF2 process will now be described with reference to FIG. 2. The feed material 200 can be any suitable gold and/or silver-containing material, particularly mined ore that has been crushed and screened to a preferred $P_{100}$ size ranging from about 7 to about 12 mesh (Tyler), with about 10 mesh (Tyler) being even more preferred.

In step 204, the material 200 is comminuted in a primary (wet) mill and, in an open or closed milling circuit, size separated in step 208, such as by using a cyclone, with the oversized comminuted slurry (or underflow) 210 being returned to step 204 and the undersized comminuted slurry (or overflow) 212 being forwarded to the conditioning step 216 prior to primary rougher flotation. Size reduction of the mined feed material 200 by crushing is preferably performed in a manner to substantially minimize oxidation of the crushed material. For example, this can be done by maintaining the crushed material in a freezing environment or processing the material in step 204 with little or no intermediate storage. When needed, proper blending of the crushed material is conducted before primary comminution to reduce variations in feed material composition. A sub-sample of the mill feed is taken to carry out size distribution and assays.

The optimum liberation size of the material 200 depends on ore type, an understanding of the ore liberation and solution chemistry of the ore, and power and media costs. Size-by-size mineral liberation analysis identifies the approximate grind size required to liberate the coarse-grained sulfide minerals from the non-sulfide gangue. Liberation analysis is commonly performed, for example, by studying the liberation behavior of the various component minerals of the ore using Mineral Liberation Analyzer or MLA, Quantitative Evaluation of Materials by Scanning Electron Microscopy or Qem-Scan, and/or optical techniques. Mineral oxidation, surface precipitation, and other factors influencing the solution chemistry can be determined by many techniques and procedures, including Time-Of-Flight Secondary Ion Mass Spectroscopy or TOF-SIMS, and/or X-ray Photoelectron Spectroscopy XPS analysis. The optimal liberation size and the grind sizes in the primary and secondary comminution stages are selected to reduce over grinding (or sliming) of the coarse sulfides. Over grinding can slow down flotation kinetics, waste grinding power, and lead to dissolution of metal ions in solution. Metal ion dissolution in the solution can detrimentally affect the flotation behavior of the sulfide minerals. In addition, prolonged galvanic interaction of sulfides with the grinding media can also slow flotation kinetics. Preferably, primary comminution and size separation are performed to provide a $P_{80}$ size of the feed material to primary rougher flotation ranging from about 100 to about 200 microns, even more preferably from about 120 to about 175 microns, and even more preferably from about 140 to about 150 microns. The preferable grind size range is dictated by the mineral grain size and other mineral and gangue associations as determined by QEM*SCAN or MLA.

Adjustment of chemical conditions is preferably performed during primary comminution. Chemical conditions are normally adjusted by adding suitable sulfide activators and reagents to control electro potential (Eh) and pH during primary comminution (milling).

Sulfide activators activate the sulfide minerals as soon as fresh sulfide surfaces are created by the mill, thereby rendering the sulfide surfaces more amenable to collector adsorption and reducing or eliminating any oxidation of the sulfide mineral surfaces. Any suitable activator may be employed, with soluble metal salts being preferred. More preferably, the activator is a transition metal salt, with copper and lead salts being even more preferred. A preferred copper salt is copper sulfate, and lead salt is lead nitrate.

The electro potential adjustor adjusts the Eh of the slurried comminuted material 200. As will be appreciated, sulfide minerals commonly float selectively only within a certain Eh window. The range of the Eh window will be different for different ore types, and the window is determined through extensive bench test work. Typically, the Eh range is from about 10 to about 200 millivolts, even more typically from about 25 to about 150 millivolts, and even more typically from about 50 to about 125 millivolts, with about 100 millivolts being even more typical. At the lower end of the Eh range, arsenopyrite floats readily while at the upper end of the Eh range pyrite floats readily. Both pyrite and arsenopyrite float in the middle of the Eh range. Outside the Eh range pyrite flotation deteriorates substantially because the mineral surface becomes less hydrophobic. Eh may be controlled by controlling the oxidation potential of the slurry, such as by using oxidants (e.g., an air atmosphere), reductants, and/or an inert gas atmosphere. Certain activators have also been found to control the Eh of the slurry. Because arsenopyrite oxidizes readily, Eh control is preferably performed primarily using the activator.

The amount of activator added during primary comminution depends on the ore composition. Sufficient activator should be present to activate the sulfide mineral surfaces and control Eh to the desired level. Too much activator is undesirable because many activators, particularly copper sulfate, are highly reactive with the collector. For example, copper ions oxidize xanthate collectors, needlessly consuming both reagents. Too little activator can be ineffective as an activator and adversely impact froth stability and frother dosage. Preferably, the activator dosage ranges from about 2.5 to about 500 g/tonne, even more preferably from about 5 to about 350 g/tonne, and even more preferably from about 10 to about 250 g/tonne of solid particles, depending on ore type.

pH adjustment of the primary mill discharge consumes acid consumers in the material 200 and cleans the surfaces of the minerals. While not wishing to be bound by any theory, it is believed that higher iron and sulfate ion concentrations in the liquid phase of the slurry can cause iron hydroxides and gypsum to precipitate and coat the mineral surfaces. Such coatings can prevent collector attachment to the mineral surface. Dissolved iron can come not only from the material but also from interaction of the slurry with the mill and grinding media. While it is preferred to use fresh water or treated water, recycle water is typically used in flotation operations. Recycle water can introduce sulfate and calcium ions into the liquid phase. As will be appreciated, the solubility limits of sulfate ion is about 1.5 g/l, of calcium is about 0.5 g/l, and of gypsum is about 500 g/l. It is believed that (sulfuric) acid addition cleans any tarnished or hydroxide coated on sulfide mineral surfaces. The amount of acid required to be added depends on the ore type, acid consumer content, and the collector to be used. For many ores, the natural pH ranges from pH 7 to about pH 8. Some collectors decompose in more acidic regimes. Preferably, sufficient acid is added to the slurry to provide an acidic pH ranging from about pH 3.5 to about pH 6.5, even more preferably from about pH 4 to about pH 6, and even more preferably from about pH 5 to about pH 6, with about pH 5.5 being preferred. For some ores, base may need to be added to increase the pH to pH 5.5 or higher. Once the pH is adjusted in primary comminution, the pH does not commonly require further adjustment during primary rougher flotation.

Some ores contain significant amounts of clays and slimes and require addition of a dispersant during primary comminution. A preferred dispersant is sold under the tradename Cyquest E-40™ (also known as Cyanamer P-80™). This dispersant is a low molecular weight polymer known to be tolerant to multivalent ions (Ca, Mg, Fe, Al, etc.) and substantially insensitive to water chemistry and acts as a sequestering agent and anti-scalant. The amount of dispersing agent depends of course on ore type but typically ranges from about 25 g/tonne to about 250 g/tonne of solid particles.

Where the process water has high levels (e.g., a saturated level) of dissolved gypsum it is desirable to add sodium carbonates (e.g., soda ash) to help clean the exposed sulfide mineral surfaces of precipitated gypsum. Preferably, the amount of soda ash added during primary comminution or flotation feed conditioning ranges from about 25 g/t to about 1000 g/t of solid particles.

The order of addition of the dispersant and soda ash can be important. Dispersants, particularly Cyquest E-40™ are acidic and can lead to evolution of $CO_2$ when mixed with soda ash, thereby rendering much of the soda ash useless. The preferred method is to put the dispersant and soda ash in the mill separately or neutralize Cyquest E-40™ with NaOH to a pH of about pH 10 to 11 and then mix the neutralized dispersant with soda ash. The mixture is then added to the primary mill or flotation feed conditioning system.

The grind media is selected to provide a substantially optimal grinding environment for flotation of gold-bearing sulfides. Selection of the mill type and composition and grinding media depends on the amount of iron (both ferrous and ferric) released during the grinding process and its effects on sulfide mineral surface oxidation, galvanic interaction, and formation of hydroxide species on mineral surfaces. The mill type may be any suitable wet mill design, including tumbling mills (e.g., rod mills, ball mills, etc.) and autogenous and semi-autogenous mills, with tumbling mills being preferred. In many applications, a stainless steel mill with high chrome grinding media (preferably from about 18 to about 21 wt. % Cr) preferred for a finer primary grinding circuit. A mild steel mill with high chrome media can work well for a coarser grind, such as the $P_{80}$ sizes referenced above.

In step 216, the undersized comminuted slurry 212 is conditioned in a suitable vessel prior to rougher flotation. In flotation, the amount of agitation and consequent dispersion are closely associated with the time required for physical and chemical reactions to take place. While the reagents can be added during grinding, disadvantages of adding all reagents in the mill include reagent interactions that consume reagents needlessly and a difficulty in controlling reagent addition rates. Conditioning before flotation can decrease flotation time. In complex ores requiring close control of conditioning time, separate conditioning tanks are normally employed.

A number of additional reagents may be added during conditioning.

When the material 200 comprises about 0.2 wt. % or more Total Carbon-containing Matter (TCM) (which includes both organic and inorganic carbon), a carbon depressant is preferably added to passivate the TCM particle surfaces, thereby rendering them hydrophilic (aerophobic) and reducing collector consumption. Selective rejection of TCM is quite important for the effectiveness of MCF2 process. Collector can be adsorbed by the TCM particles in preference to the sulfides. Activation of the TCM particles can also result in lowering the concentrate grade. Any suitable TCM depressant can be employed. Suitable TCM depressants include sulfonates (e.g., sodium naphthalene sulfonate), and depressants manufactured under the tradenames Depramin by Akzo Nobel and Cytec 633™. The TCM depressant is preferably added to the slurry after pH adjustment. Depressant dosage is carefully controlled as high dosages can lead to depression of sulfides and low dosages can be ineffective in depressing TCM particles. The depressant dosage preferably ranges from about 1 g/tonne to about 50 g/tonne of solid particles depending on the TCM content in the undersized comminuted slurry 212.

The collector is preferably added after the carbon depressant. Collectors are organic surfactants that render sulfide minerals water-repellent, or hydrophobic to such a level that attachment of the particle to the bubble can be made on contact. Preferably, the collector is anionic, more preferably a sulphydryl compound, even more preferably a xanthogenate (also known as a xanthate), with alkali metal xanthates, such as Potassium Amyl Xanthate (PAX), being even more preferred. The collector is typically added to the slurry 212 and conditioned for a time ranging from about 1 to 5 minutes depending on the ore type. The collector dosage preferably ranges from about 100 to about 500 g/tonne of solid particles, depending on the ore type.

Normally, the frother, which adds stability to the air bubbles, is added last since it does not react chemically, only requires dispersion in the pulp, and does not need long conditioning times. Preferably, the frother is a heteropolar surface-active organic reagent including a hydroxyl, carboxyl, carbonyl, amino or sulpho functional group. Alcohol-based frothers are preferred, with a mixture of MethylIsobutyl Carbinal (MIBC) and a stronger glycol-based frother sold under the tradename Cytec F549™ being even more preferred. The frother dosage preferably ranges from about 10 g/tonne to about 150 g/tonne of solid particles depending on ore types and water quality. The conditioned slurry, or flotation pulp, preferably ranges from about 20 to about 40% solids by weight.

In the primary rougher flotation circuit (step 220), the conditioned slurry is floated in a bank, or series, of flotation machines. The flotation machines can be aerated flotation cells or columns. Rougher flotation may include one or more stages 220 and 222, depending on the application. In rougher flotation, preferably about 40% or more and even more preferably about 60% or more of the sulfide minerals, and about 60% or more of the gold and/or silver, and no more than about 20% of the TCM-containing minerals in the material 200 are removed in the concentrate 224. The rougher tails commonly include some of the gold and/or silver bearing sulfide minerals and preferably include most, and even more preferably about 75% or more, of the TCM in the material 200. The concentrate 224 preferably has a sulfide sulfur content of about 4 wt. % or more and even more preferably of about 6.5 wt. % or more. The unfloated sulfide minerals in the tailings fraction 228 represent the slower floating sulfide mineral particles that require further comminution for effective liberation to be realized.

In step 232, the tailings fraction 228 is further comminuted to a finer size. Preferably, secondary comminution and size separation (step 236) (preferably by a cyclone) are performed to provide a $P_{80}$ size of the further comminuted slurry 240 ranging from about 25 to about 100 microns, even more preferably from about 35 to about 75 microns, and even more preferably from about 40 to about 60 microns.

In the secondary mill, the same additives added in the primary mill may be contacted with the tailings fraction, with the dosages depending on ore types and target metallurgy. Generally, the cumulative amounts added are less due to the lesser volume (tonnage) of the tailings fraction and residual concentrations of reagents. Acid is again added to reduce the pH to the levels noted previously and the density of the tailings fraction adjusted to the range noted above.

The further comminuted slurry 240 is conditioned in step 248. In the conditioning step, the same additives added in the prior conditioning step 216 may be added, with the dosages depending on ore types and target metallurgy. Generally, the cumulative amounts added are less due to the lesser volume (tonnage) of the tailings fraction and the presence of residual concentrations of reagents from the primary flotation circuit.

The further conditioned slurry 250 is subjected to further flotation in the first and second (optional) scavenger flotation circuits 252 and 256. Compared to the rougher flotation circuits, the scavenger flotation circuits have lower froth depth due to higher tailings overflow weirs. Scavenger flotation is commonly run with an optimum froth residence time to obtain maximum recovery. Higher froth recovery in the flotation cells is normally required to maximize gold recovery. In scavenger flotation, preferably about 40% or more and even more preferably about 60% or more of the sulfide minerals, no more than about 20% of the TCM-containing minerals and acid consumers, and about 40% or more of the gold and/or silver in the further conditioned slurry 250 are removed in the concentrate 260. The scavenger tails 264 preferably include about 70% or more of the TCM and no more than about 1% of the sulfides in the rougher tails 228. The concentrate 260 preferably has a sulfide sulfur content of about 4 wt. % or more and even more preferably of about 6.5 wt. % or more.

The scavenger tailings fraction 264 typically comprises no more than about 90 wt. % and even more typically from about 1 to about 2 wt. % sulfides and about 1% or more and even more typically about 10% or more of the TCM in the material 200.

The concentrate 260 may be further conditioned (not shown) and subjected to scavenger cleaner flotation in first scavenger cleaner and optional second scavenger cleaner flotation circuits 268 and 272. Compared to scavenger flotation, in scavenger cleaner flotation the tailings weir height is lower to maintain a deep froth and produce a relatively high-grade scavenger cleaner concentrate 276 and a lower scavenger cleaner tailings 280.

In scavenger cleaner flotation, preferably about 5% or more and even more preferably about 20% or more of the sulfide minerals, no more than about 40% of the TCM-containing minerals, and most, if not all, of the gold and/or silver in the further conditioned slurry 250 are removed in the scavenger concentrate 260. Combined, the rougher and scavenger cleaner concentrates 224 and 276 preferably account for more than about 85%, even more preferably about 90% or more, and even more preferably about 95% or more of the gold in the material 200.

The scavenger cleaner tailings fraction 280 typically comprises no more than about 5 wt. % and even more typically no more than about 10 wt. % sulfides, no more than about 20% of the TCM, in the material 200. The scavenger cleaner tailings 280 can be recirculated to rougher flotation or discarded.

The various cleaning stages used depend on the metallurgy targets. In most configurations, the MCF2 process focuses primarily on substantially maximizing grade and recovery in the rougher circuit. This emphasis can provide better cleaning since the rougher circuit using the MCF2 process can provide an optimum starting point.

Other MCF2 process configurations may be employed.

Figure 2:
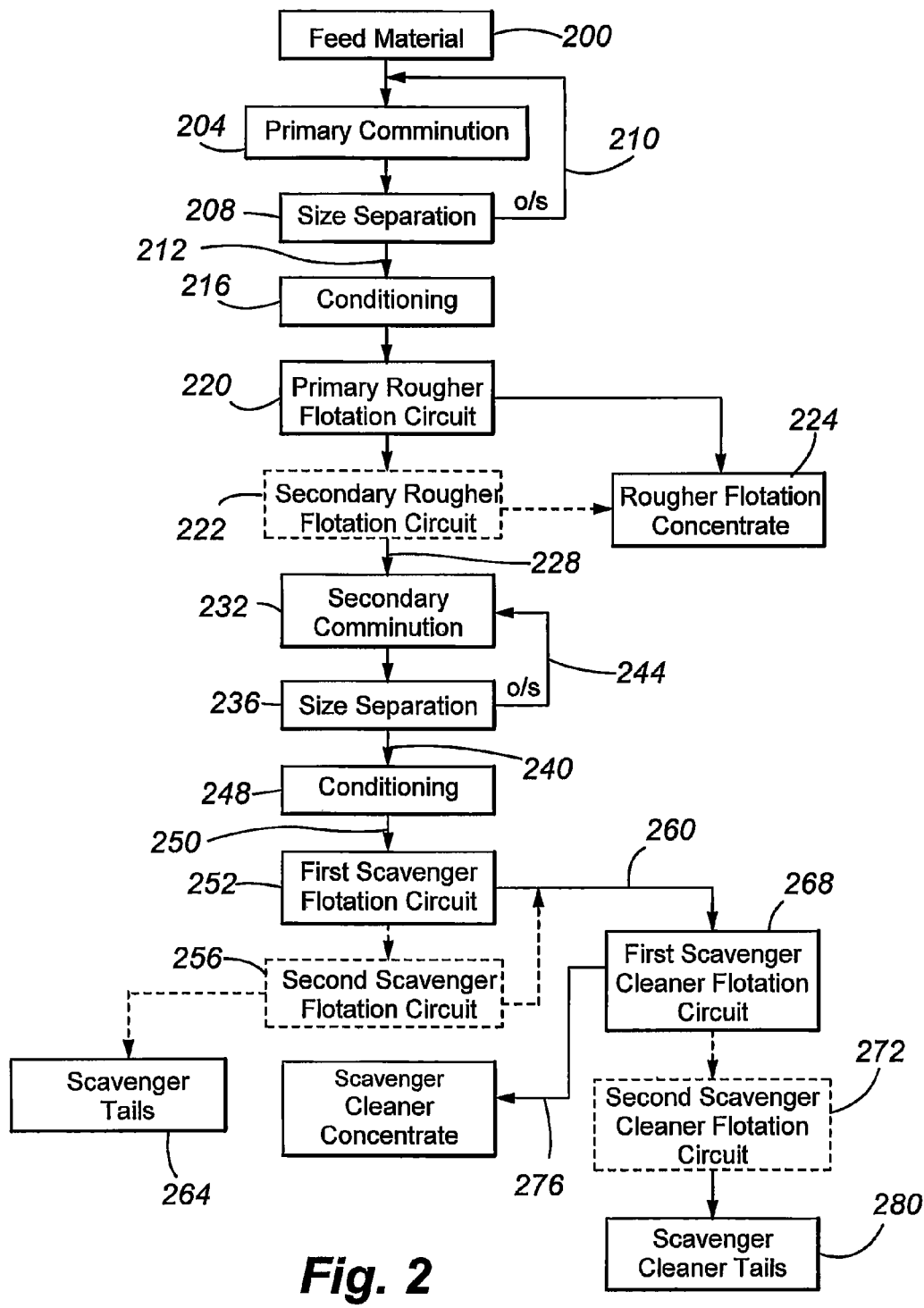
FIG. 2 is a flowchart of a sulfide flotation process according to an embodiment of the present invention.
Figure 3:
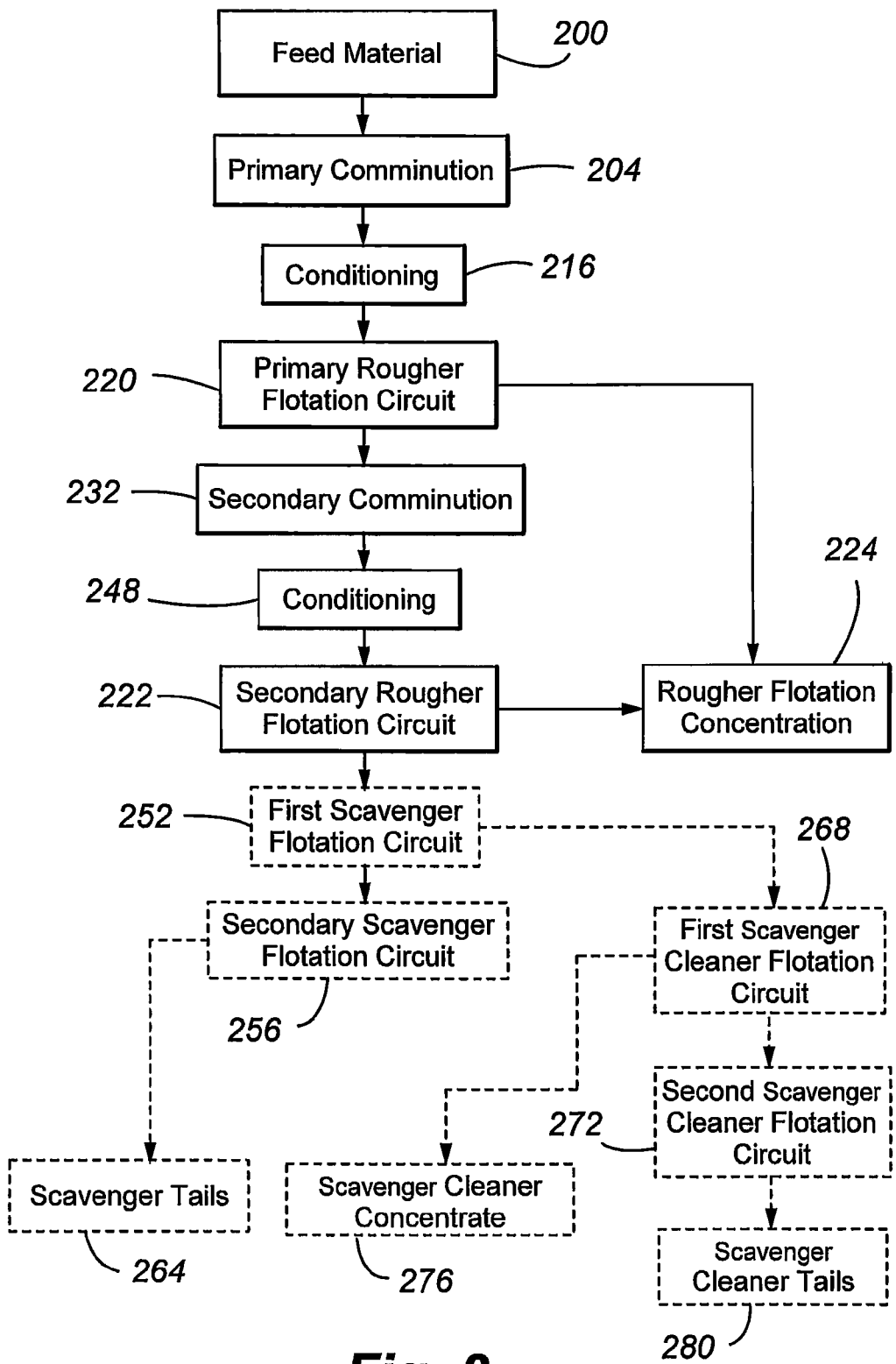
FIG. 3 is a flowchart of a sulfide flotation process according to an embodiment of the present invention.

A first alternative configuration is shown in FIG. 3. This configuration differs from that of FIG. 2 primarily in the use of open milling circuits having no size separation steps 208 and 236 and the placement of secondary comminution 232 and conditioning 248 before secondary rougher flotation circuit 222. Tramp screens are used in the primary mill discharge to prevent large rocks from passing into the rougher flotation circuit.

Figure 4:
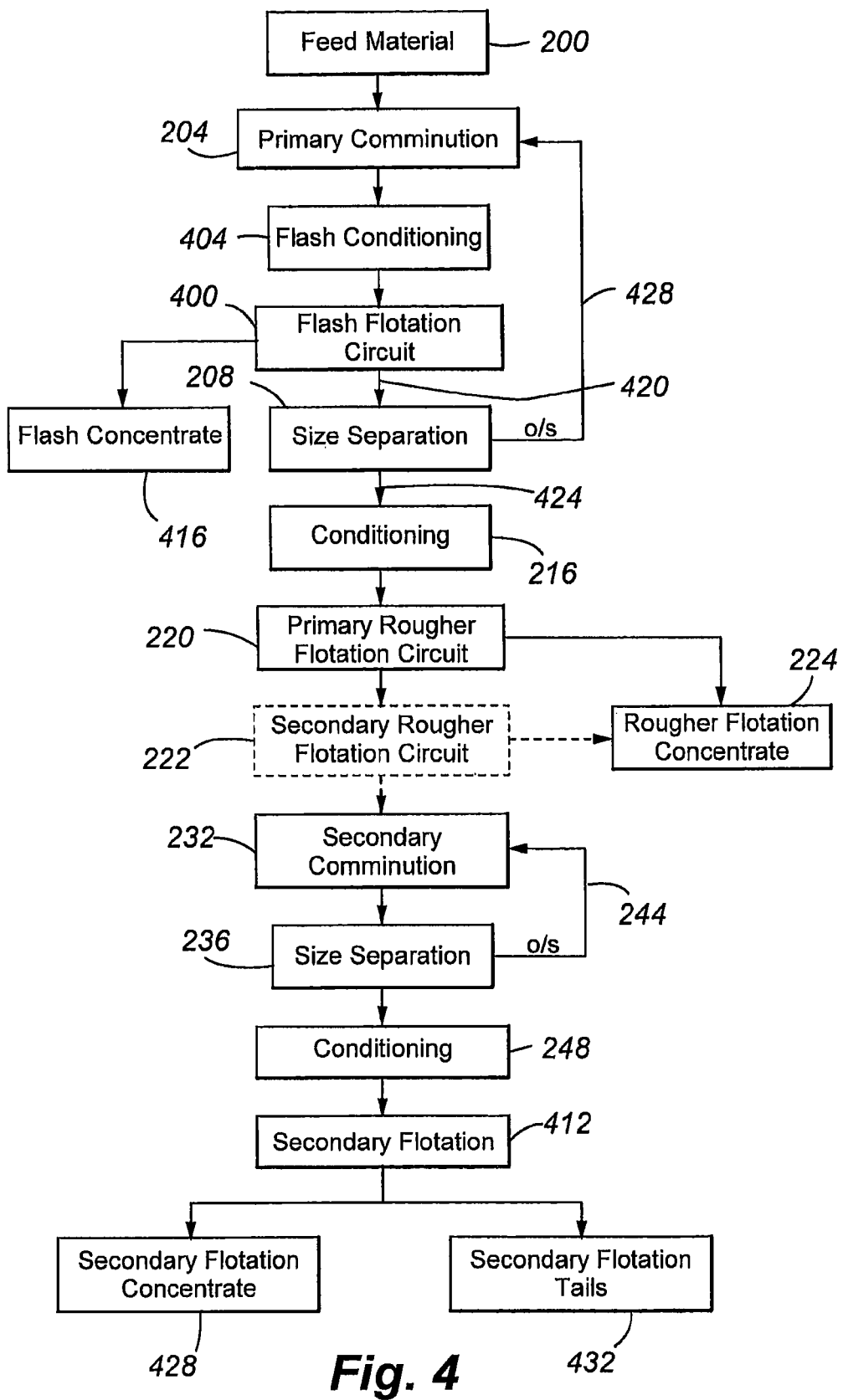
FIG. 4 is a flowchart of a sulfide flotation process according to an embodiment of the present invention.

A second alternative configuration is shown in FIG. 4. This configuration differs from that of FIG. 2 primarily in the use of a flash flotation circuit 400 and flash conditioning 404 after primary comminution and before size separation 208 and inclusion of the secondary flotation circuit 412. The flash flotation circuit 400 recovers fast floating sulfide minerals in flash concentrate 416. The flash flotation tailings 420 are then size separated or classified to provide a finer product 424 that does not require regrinding and a coarser product 428 that requires regrinding followed by flash flotation. In some cases, depending on the cut size the finer product may need a polishing grinding or further chemical treatment, such as by conditioning step 216, to improve flotation performance. The secondary flotation circuit 412 produces a secondary flotation concentrate 428 and secondary flotation tails 432.

Figure 5:
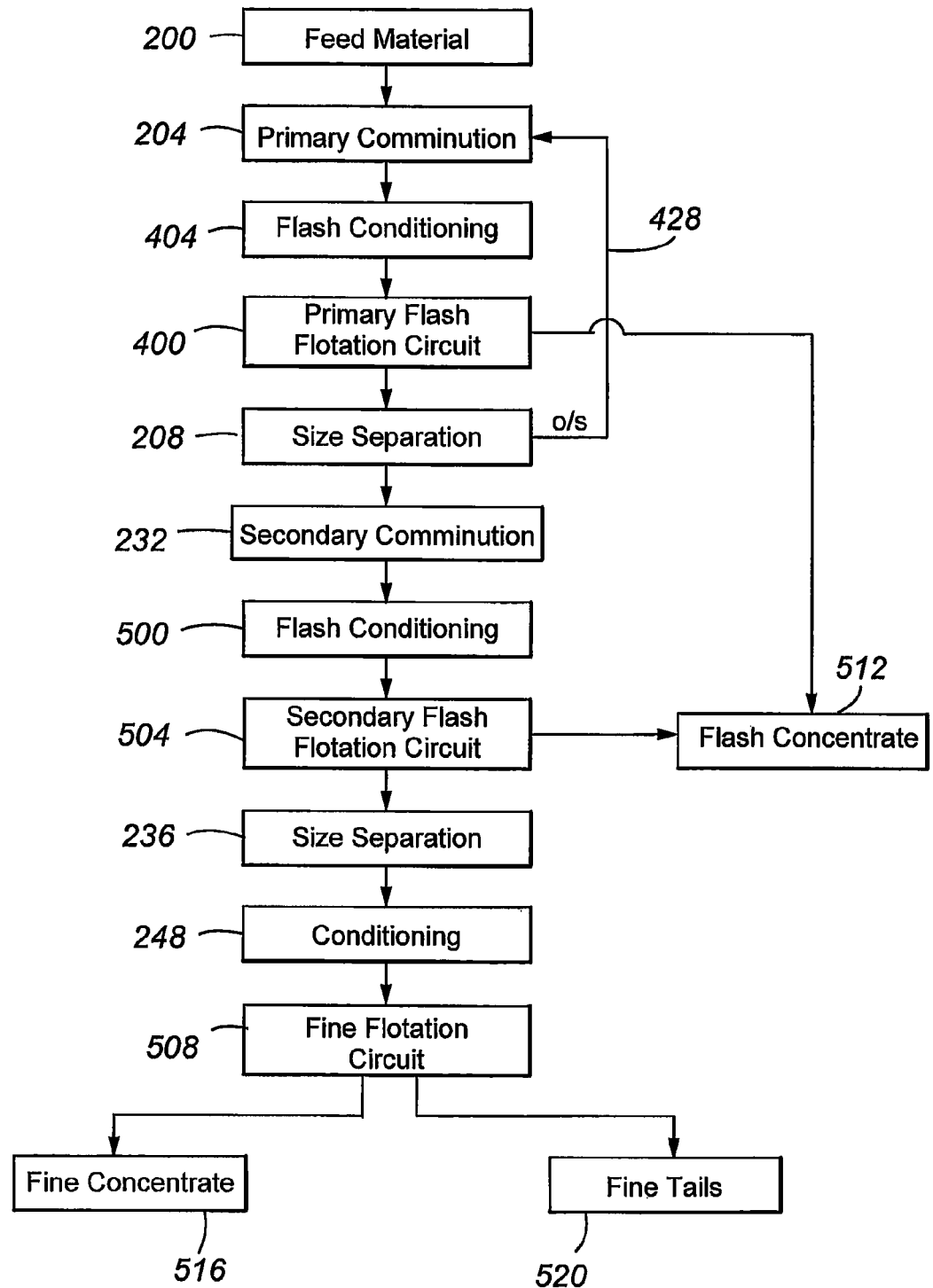
FIG. 5 is a flowchart of a sulfide flotation process according to an embodiment of the present invention.

A third alternative configuration is shown in FIG. 5. This configuration differs from that of FIG. 4 by the inclusion of secondary flash conditioning 500 and flotation circuit 504 after secondary comminution 232 and fine flotation circuit 508. Primary and secondary flash flotation collectively produces flash concentrate 512 while fine flotation produces fine concentrate 516 and tails 520.

In the second and third alternative configurations, the flash flotation units can be on mill discharge (as shown) or cyclone underflow (not shown). Flash flotation on mill discharge is preferred because the coarsely liberated particles will not be over ground, leading to sliming and lower gold recoveries. Flash flotation removes these particles before classification and recycle of the oversize back to the mill.

Experimental

A series of bench and pilot flotation tests were performed to demonstrate the benefits of MCF2 in improving gold recovery to obtain a concentrate grade of 7% sulfur over that achievable with a conventional flotation circuit. While not wishing to be bound by any theory, it is believed that MCF2 beneficially uses the first stage of grind/flotation to recover the fast-floating liberated sulfide particles at a grind size coarser than that employed during conventional refractory gold ore flotation. In addition it is believed that the MCF2 secondary comminution step reduces the primary rougher flotation tails down to size which liberates the composite sulfide particles, allowing their flotation to the concentrate and resulting in a higher overall gold recovery. The secondary comminution step must be controlled such that the sulfide particles are liberated, while over-grinding is avoided through a staged grinding and flotation approach.

The feed ore used for the experimental work contained about 0.37% arsenic, 2.9 g/t 1.1% total sulfur, 1% sulphide sulfur, 0.82% total carbon and 3.17% carbonate. The major sulphide minerals are arsenopyrite and pyrite with the feed to the process had a $P_{80}$ size of −6 mesh (Tyler). Gold in the ore is nearly exclusively sub-microscopic. Arsenopyrite is the primary host of sub-microscopic gold accounting for 77-88% of the gold head assay. Gold is unevenly distributed in arsenopyrite, concentrating along the rims of large crystals and in fine-grained arsenopyrite. Based on the gold deportment in the three ore types, in order to achieve flotation recoveries exceeding 90% it is essential to recover not only free arsenopyrite but also free pyrite and binary particles of quartz carrying fine grained arsenopyrite.

A comparison of MCF2 and conventional grinding was conducted on the bench scale. For the MCF2, a primary comminution product size of $P_{80}$ 120 µm, and a secondary comminution product with a $P_{80}$ 40 µm were employed. For the conventional test, the grind size of $P_{80}$ 73 µm was employed. Total PAX and frother dosage rates were kept the same for all tests; however given that two stages of grinding were used for MCF2, dispersant and copper sulfate dosage were added for all the MCF2 tests to enable fresh copper sulfate and dispersant to be added to the second stage of grinding to contact with freshly exposed (new) sulfide surfaces generated from that additional grinding stage and provide the optimum potential control for flotation. As shown in Table 1, the MCF2 (Test 2) process exhibits a gold loss to the flotation tails of 3.88% which is substantially lower than loss of 5.65% observed in the conventional circuit.

TABLE 1

Bench Scale Comparison of Conventional and MCF2 Flotation

| Circuit Prim. Grind Sec. Grind | Conventional $P_{80} = 73$ μm | | MCF2 $P_{80}$ F1 = 120 μm $P_{80}$ F2 = 39 μm | |
|---|---|---|---|---|
| | Gold Recovery % | Concentrate Sulfur. Grade % | Gold Recovery. % | Concentrate Sulfur. Grade % |
| Rougher 1 | 41.34 | 23.30 | 31.50 | 30.70 |
| Rougher 2 | 69.03 | 19.41 | 69.79 | 24.89 |
| Rougher 3 | 81.52 | 16.16 | 81.88 | 18.87 |
| Rougher 4 | 88.46 | 13.15 | 86.20 | 15.67 |
| Rougher 5 | 92.03 | 10.04 | 93.73 | 10.37 |
| Rougher 6 | 94.35 | 6.43 | 96.12 | 6.84 |
| Rougher Tail | 5.65 | 0.05 | 3.88 | 0.04 |

Subsequent bench tests were then undertaken to attempt to quantify the effect of the secondary grind size on gold recovery. The results achieved from this test series were not able to clearly define an optimal secondary grind target. Since no classification is carried out for mill discharge in the bench, it is often difficult to replicate a continuous operation. Liberation behaviour of the minerals suggested a target secondary grind of 50 μm ($P_{80}$)

A pilot plant trial was carried out to compare MCF2 (FIG. 2) with a conventional flowsheet (FIG. 1). With reference to FIG. 1, the conventional flotation circuit employed a closed comminution circuit 104 (using a cyclone). The feed rate to the grinding circuit was 48 kg/hour, with a ball mill feed $P_{80}$ of 2217 microns, a ball mill discharge $P_{80}$ of about 75 microns. The cyclone underflow was subjected to a primary rougher flotation (step 108), to produce a rougher flotation concentrate and the primary rougher tails. The primary rougher tails was subjected to the secondary rougher flotation (step 112). The secondary rougher flotation tails were then subjected to first and second scavenger flotation (steps 120 and 124). The first and second scavenger concentrates are combined and then subjected to first and second cleaner flotation (steps 128 and 136).

With reference to FIG. 2, the MCF2 circuit tested included primary (step 204 and 208) comminution circuit followed by conditioning (step 216) prior to the primary and secondary rougher flotation (steps 220 and 222). The flotation tails from the secondary flotation were then ground in a second closed comminution circuit (steps 232 and 236) followed by conditioning (step 248) and the first and second scavenger flotation (steps 252 and 256). The combined scavenger concentrates were then subjected to the first and second scavenger cleaner flotation (steps 268 and 272).

A second series of tests were conducted comparing MCF2 and conventional flotation in a continuous pilot operation Table 2 shows a summary of the test results.

TABLE 2

Summary of Pilot Test Comparing Conventional Flotation with MCF2

| Test No. | Run time (hrs) | Total Reagent Addition, g/t | | | | | | Concentrate Grade | | |
|---|---|---|---|---|---|---|---|---|---|---|
| | | $CuSO_4$ | $H_2SO_4$ | F549 | PAX | MIBC | Disp. | Weight (%) | As (%) | Au (g/t) |
| *Convention Circuit (Rougher/Scavenger with Scav Conc Cleaning-Stainless steel primary mill)* | | | | | | | | | | |
| PP-01 A | 6.0 | 62 | — | — | 510 | 127 | — | 9.4 | 3.09 | 27.0 |
| PP-01 B | 3.5 | 64 | — | — | 546 | 147 | 66 | 9.7 | 3.20 | 25.1 |
| PP-02 A | 5.6 | 59 | — | — | 541 | 144 | 61 | 10.3 | 3.16 | 25.1 |
| PP-02 B | 4.0 | 123 | — | — | 570 | 151 | 66 | 10.0 | 3.23 | 26.2 |
| *Convention Circuit (Rougher/Scavenger with Scav Conc Cleaning-Mild steel primary mill)* | | | | | | | | | | |
| PP-03 A | 7.4 | 92 | — | — | 545 | 156 | — | 14.1 | 2.27 | 18.5 |
| PP-03 B | 3.0 | 88 | — | 9 | 537 | 172 | — | 29.9 | 1.15 | 9.5 |
| PP-04 | 7.9 | 169 | 1,098 | 5 | 526 | 162 | — | 22.0 | 1.59 | 12.5 |
| PP-05 A | 6.3 | 175 | 488 | 3 | 530 | 180 | — | 19.8 | 1.70 | 13.3 |
| PP-05 B | 3.5 | 219 | — | 3 | 557 | 204 | — | 15.8 | 1.99 | 15.5 |
| PP-06 A | 6.5 | 165 | 1,970 | 3 | 575 | 125 | — | 13.4 | 2.39 | 19.8 |
| PP-06 B | 3.5 | 198 | 1,225 | 3 | 596 | 138 | 134 | 8.1 | 4.06 | 30.9 |
| *MCF2 Circuit Configuration (Primary Rougher/Secondary Rougher with Sec Rougher Conc Cleaning)* | | | | | | | | | | |
| PP-09 | 9.2 | 94 | 1,085 | 6 | 523 | 88 | 0 | 21.7 | 1.70 | 13.7 |
| PP-10 | 6.1 | 209 | 1,935 | 10 | 470 | 104 | 92 | 13.5 | 2.60 | 20.3 |
| PP-11 A | 6.6 | 198 | 3,018 | 1 | 493 | 127 | 89 | 15.4 | 2.18 | 17.7 |
| PP-11 B | 3.8 | 178 | 4,460 | — | 667 | 162 | 89 | 17.2 | 2.10 | 16.3 |
| PP-12 A | 6.3 | 269 | 2,263 | — | 528 | 151 | 88 | 16.4 | 1.99 | 16.9 |
| PP-12 B | 3.8 | 272 | 4,150 | — | 532 | 175 | 92 | 23.3 | 1.43 | 11.2 |

| Test No. | Concentrate Grade | | | | Component Distribution (Recovery) to Conc (%) | | | | | |
|---|---|---|---|---|---|---|---|---|---|---|
| | S (%) | $S^{2-}$ (%) | C(t) (%) | $CO_3$ (%) | As | Au | S | $S^{2-}$ | C | $CO_3$ |
| *Convention Circuit (Rougher/Scavenger with Scav Conc Cleaning-Stainless steel primary mill)* | | | | | | | | | | |
| PP-01 A | 10.8 | 9.39 | 1.90 | 3.02 | 88.3 | 89.4 | 95.0 | 99.0 | 22.2 | 8.51 |
| PP-01 B | 11.9 | 10.3 | 2.24 | 3.04 | 88.3 | 89.1 | 94.9 | 99.2 | 25.9 | 8.88 |

TABLE 2-continued

Summary of Pilot Test Comparing Conventional Flotation with MCF2

| PP-02 A | 12.2 | 10.0 | 2.45 | 3.28 | 89.7 | 91.8 | 96.3 | 99.5 | 27.9 | 9.61 |
|---|---|---|---|---|---|---|---|---|---|---|
| PP-02 B | 10.6 | 8.76 | 2.67 | 2.91 | 89.1 | 91.7 | 97.0 | 99.8 | 30.1 | 8.81 |

Convention Circuit (Rougher/Scavenger with Scav Conc Cleaning-Mild steel primary mill)

| PP-03 A | 7.5 | 7.29 | 1.95 | 3.36 | 90.9 | 92.0 | 96.7 | 99.5 | 30.4 | 13.2 |
|---|---|---|---|---|---|---|---|---|---|---|
| PP-03 B | 3.7 | 3.24 | 1.37 | 3.39 | 94.3 | 94.9 | 97.6 | 99.3 | 45.9 | 29.7 |
| PP-04 | 5.0 | 4.42 | 1.74 | 3.72 | 93.8 | 94.3 | 96.7 | 99.5 | 39.9 | 22.2 |
| PP-05 A | 5.7 | 5.20 | 1.43 | 3.22 | 93.2 | 94.1 | 97.7 | 99.6 | 33.2 | 18.5 |
| PP-05 B | 6.9 | 5.93 | 1.83 | 3.72 | 92.4 | 93.1 | 98.1 | 99.2 | 32.6 | 16.5 |
| PP-06 A | 7.7 | 6.57 | 1.96 | 3.56 | 91.7 | 92.8 | 96.5 | 98.8 | 29.8 | 13.7 |
| PP-06 B | 13.3 | 11.7 | 2.62 | 2.95 | 89.0 | 90.2 | 94.7 | 99.4 | 24.6 | 7.09 |

MCF2 Circuit Configuration (Primary Rougher/Secondary Rougher with Sec Rougher Conc Cleaning)

| PP-09 | 4.5 | 3.88 | 1.49 | 1.99 | 91.8 | 95.4 | 98.9 | 100 | 51.8 | 22.7 |
|---|---|---|---|---|---|---|---|---|---|---|
| PP-10 | 8.9 | 6.68 | 1.99 | 3.69 | 93.4 | 94.2 | 97.1 | 100 | 29.1 | 13.7 |
| PP-11 A | 7.3 | 6.70 | 1.71 | 3.14 | 93.8 | 94.7 | 97.8 | 99.3 | 31.2 | 14.9 |
| PP-11 B | 6.7 | 5.97 | 1.72 | 3.20 | 94.4 | 94.7 | 98.2 | 100 | 34.5 | 16.9 |
| PP-12 A | 6.7 | 5.65 | 1.64 | 3.07 | 93.6 | 94.7 | 97.8 | 97.5 | 33.4 | 16.2 |
| PP-12 B | 4.6 | 3.66 | 1.39 | 3.01 | 94.4 | 94.8 | 98.4 | 99.3 | 40.3 | 22.7 |

Figure 6:
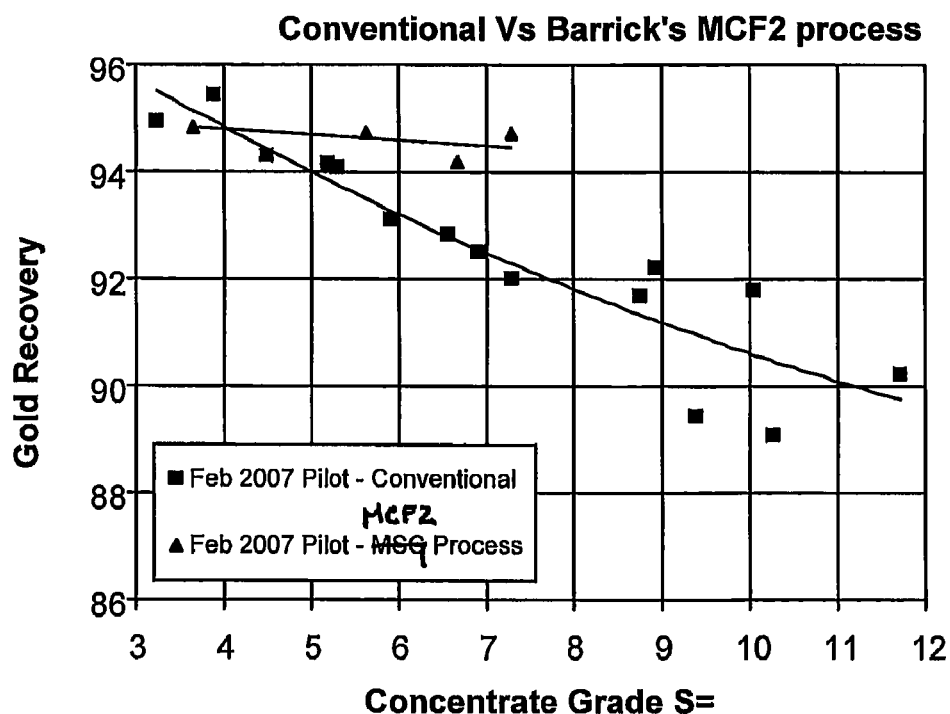
FIG. 6 is a plot of gold recovery (vertical axis) (percent) against concentrate grade (sulfide sulfur) (horizontal axis) (weight percent)

Referring to FIG. 6, it can be seen that gold recovery and concentrate grade (sulfide sulfur) is superior for the conventional process at concentrate grades less than about 4% sulfur but superior for the MCF2 process at concentrate grades higher than about 4% sulfur. At a target concentrate grade of 7% S or greater, the MCF2 process showed approximately 2% higher Au recovery.

Figure 7:
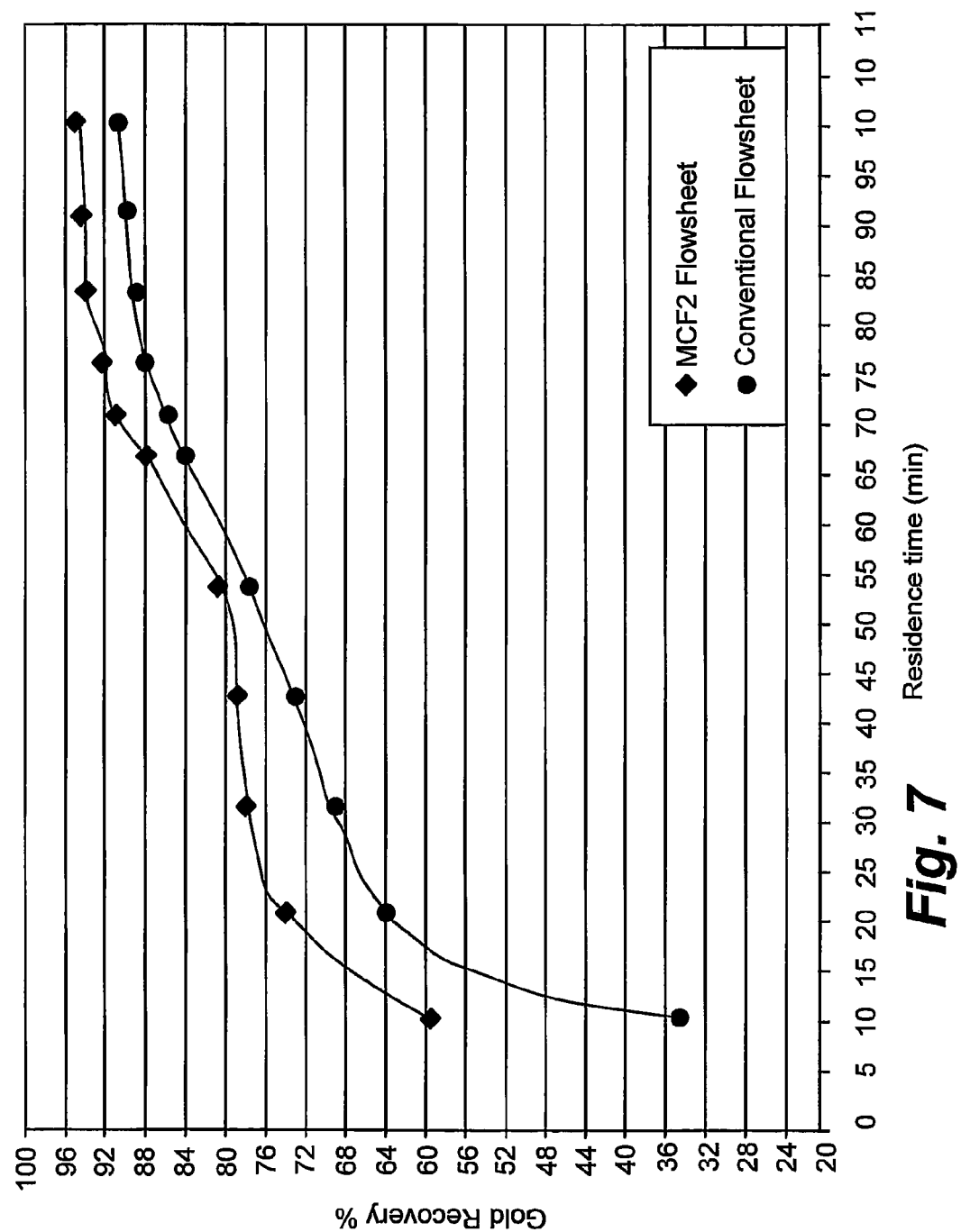
FIG. 7 is a plot of gold recovery (vertical axis) (percent) against flotation residence time (horizontal axis) (minutes)

FIG. 7 shows the flotation kinetics for the conventional and MCF2 processes. For a given flotation residence time, the MCF2 process produces a higher gold recovery.

Figure 8:
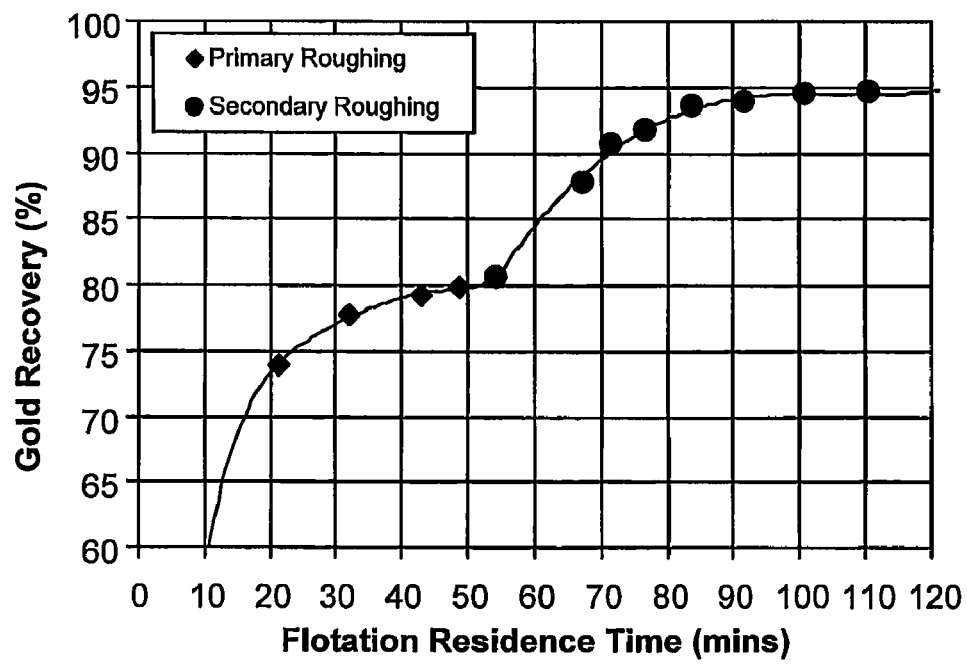
FIG. 8 is a plot of gold recovery (vertical axis) (percent) against flotation residence time (horizontal axis) (minutes)

FIG. 8 shows the relationship between gold recovery versus flotation residence time for the MCF2 process. With a secondary grind on primary rougher tails, a significant improvement in flotation kinetics was observed for the secondary rougher.

Figure 9:
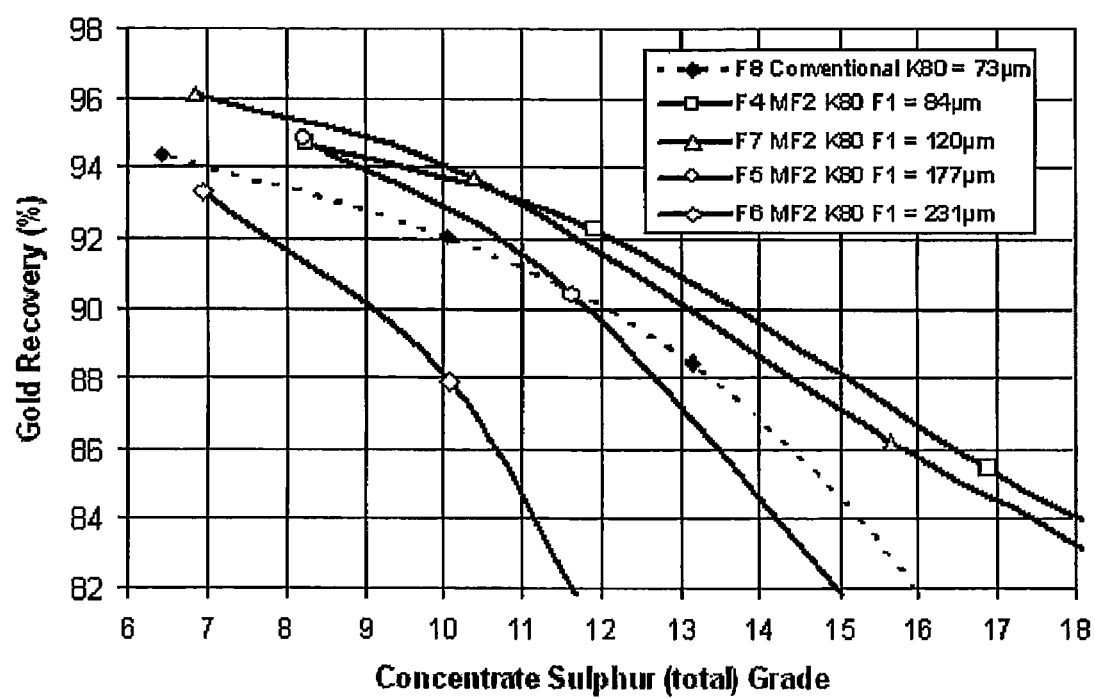
FIG. 9 is a plot of gold recovery (vertical axis) (percent) against concentrate sulfur (total) grade (horizontal axis) (wt. percent).

FIG. 9 shows the relationship between gold recovery and concentrate sulfur grade for the MCF2 process versus a conventional flotation process having rougher and scavenger circuits followed by a concentration cleaning circuit. At concentrate sulfur grades below approximately 11.5 wt. %, the MCF2 process produces a higher gold recovery than the conventional process.

A number of variations and modifications of the invention can be used. It would be possible to provide for some features of the invention without providing others.

In one embodiment, reverse, rather than direct, flotation is performed. In reverse flotation, the gangue minerals are floated in the concentrate while the valuable, or gold-containing, minerals remain in the tails.

The present invention, in various embodiments, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. The features of the embodiments of the invention may be combined in alternate embodiments other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations, combinations, and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   (a) providing a refractory feed material, the refractory feed material comprising gold, sulfides, a carbonaceous preg robbing component, and a clay;
   (b) comminuting the refractory feed material to form a comminuted feed material having a first size distribution;
   (c) during comminuting, adjusting chemical conditions of the refractory feed material by adding a sulfide activator and a polymeric clay dispersant;
   (d) after the comminuting step (b), contacting the comminuted feed material with a carbonaceous component depressant, collector, and frother;
   (e) floating the comminuted feed material, in the presence of the sulfide activator, the polymeric clay dispersant, the collector, the frother, and the carbonaceous component depressant, at a pH ranging from about pH 3.5 to about pH 6.5, and at an Eh ranging from about 25 to about 100 millivolts, to form first and second fractions, the first and second fractions each comprising at least some of the gold and sulfides in the refractory feed material;

(f) comminuting the second fraction to provide a comminuted second fraction, the comminuted second fraction having a second size distribution finer than the first size distribution;

(g) during comminuting, adjusting chemical conditions of the second fraction by adding the sulfide activator and polymeric clay dispersant;

(h) after the comminuting step (f), contacting the comminuted second fraction with the carbonaceous component depressant, collector, and frother; and (i) further floating the comminuted second fraction, in the presence of the polymeric clay dispersant, the sulfide activator, the collector, the frother, and the carbonaceous component depressant, at a pH ranging from about 3.5 to about pH 6.5, and at an Eh ranging from about 25 to about 100 millivolts, to produce third and fourth fractions, the third fraction comprising at least most of the gold and sulfides in the second fraction.

2. The method of claim 1, wherein, in steps (b) and (f), the refractory feed material and second fraction, respectively, are wet milled and wherein the sulfide activator and polymeric clay dispersant are added during each of steps (b) and (f).

3. The method of claim 2, wherein the sulfide activator is a metal salt selected from the group consisting essentially of copper salts, lead salts, and mixtures thereof, wherein the first size distribution is a $P_{80}$ size ranging from about 100 to about 200 microns, wherein the second size distribution is a $P_{80}$ size ranging from about 25 to about 100 microns, wherein an amount of sulfide activator added during steps (b) and (f) is insufficient to oxidize substantially the collector.

4. The method of claim 2, wherein the collector is an anionic collector and further comprising before step (e):
after step (b) and before step (e), adjusting a pH of the comminuted feed material to provide the pH ranging from about pH 3.5 to about pH 6.5;
after pH adjustment, contacting the carbonaceous component depressant with the comminuted feed material;
after addition of the carbonaceous component depressant, contacting an anionic collector with the comminuted feed material;
after addition of the anionic collector, contacting the frother with the comminuted feed material;
after step (f) and before step (i), adjusting a pH of the comminuted second fraction to provide a pH ranging from about pH 3.5 to about pH 6.5;
after pH adjustment, contacting the carbonaceous component depressant with the comminuted second fraction; and
after addition of the carbonaceous component depressant, contacting the anionic collector with the comminuted second fraction;
after addition of the anionic collector, contacting the frother with the comminuted second fraction.

5. The method of claim 1, wherein the depressant is a sulfonate and is not added in a sufficient amount to depress sulfide flotation and wherein the comminuted feed material comprises gypsum and further comprising:
contacting the comminuted feed material with a sodium carbonate to clean exposed sulfide mineral surfaces of precipitated gypsum.

6. The method of claim 1, wherein the first and third fractions have a sulfide sulfur content of at least about 6.5 wt. %, wherein the refractory feed material comprises silicates, wherein at least most of the silicates in the refractory feed material are in the fourth fraction, wherein, in step (e), the first fraction comprises about 40% of more of the sulfides in the refractory feed material and no more than about 20% of the carbonaceous preg robbing component and wherein, in step (i), the third fraction comprises about 40% of more of the sulfides in the refractory feed material and no more than about 20% of the carbonaceous preg robbing component.

7. The method of claim 1, wherein step (e) is flash flotation and further comprising:
after step (e) and before step (f), size separating the second fraction to form oversized and undersized fractions and wherein the oversized fraction is recycled to step (b).

8. The method of claim 1, wherein step (i) is flash flotation and further comprising:
size separating the fourth fraction to form oversized and undersized fractions and wherein the oversized fraction is comminuted in step (f).

9. The method of claim 1, wherein, in each of steps (b) and (f), from about 10 to about 250 g/tonne of sulfide activator is added and from about 25 to about 250 g/tonne of polymeric clay dispersant is added.

10. The method of claim 1, wherein, in each of steps (e) and (i), flotation is performed in the presence of from about 1 to about 50 g/tonne of the carbonaceous material depressant and wherein the carbonaceous material depressant is a sulfonate to reduce consumption of collector and frother.

11. The method of claim 1, wherein each of steps (e) and (i) is performed in the presence of air bubbles.

12. The method of claim 1, wherein the sulfide activator is copper sulfate and wherein the sulfide activator substantially inhibits oxidation of sulfide surfaces exposed during comminution.

13. The method of claim 1, further comprising:
(j) recovering the gold from the first and third fractions.

14. A method, comprising:
(a) providing a refractory feed material, the refractory feed material comprising gold, sulfides, a carbonaceous preg robbing component, and a clay;
(b) comminuting the refractory feed material to form a comminuted feed material having a first size distribution;
(c) during comminuting, adjusting chemical conditions of the refractory feed material by adding a sulfide activator;
(d) after the comminuting step (b), contacting the comminuted feed material with a carbonaceous component depressant, collector, and frother;
(e) floating, in the presence of air bubbles, the comminuted feed material, in the presence of the sulfide activator, the collector, the frother, and the carbonaceous component depressant, at a pH ranging from about pH 3.5 to about pH 6.5, and at an Eh ranging from about 25 to about 100 millivolts, to form first and second fractions, the first and second fractions each comprising at least some of the gold and sulfides in the refractory feed material;
(f) comminuting the second fraction to provide a comminuted second fraction, the comminuted second fraction having a second size distribution finer than the first size distribution;
(g) during comminuting, adjusting chemical conditions of the second fraction by adding the sulfide activator;
(h) after the comminuting step (f), contacting the comminuted second fraction with the carbonaceous component depressant, collector, and frother; and (i) further floating, in the presence of air bubbles, the comminuted second fraction, in the presence of the sulfide activator, the collector, the frother, and the carbonaceous component depressant, at a pH ranging from about 3.5 to about pH 6.5, and at an Eh ranging from about 25 to about 100 millivolts, to produce third and fourth fractions, the third fraction comprising at least most of the gold and sulfides in the second fraction, wherein an amount of sulfide activator added during steps (b) and (f) is insufficient to oxidize substantially the collector.

15. The method of claim 14, wherein, in steps (b) and (f), the refractory feed material and second fraction, respectively, are wet milled, wherein, in steps (c) and (g), a polymeric clay dispersant is added, and wherein the sulfide activator and polymeric clay dispersant are added during each of steps (b) and (f).

16. The method of claim 15, wherein the sulfide activator is a metal salt selected from the group consisting essentially of copper salts, lead salts, and mixtures thereof, wherein the first size distribution is a $P_{80}$ size ranging from about 100 to about 200 microns, and wherein the second size distribution is a $P_{80}$ size ranging from about 25 to about 100 microns.

17. The method of claim 15, wherein the collector is an anionic collector and further comprising before step (e):
    after step (b) and before step (e), adjusting a pH of the comminuted feed material to provide the pH ranging from about pH 3.5 to about pH 6.5;
    after pH adjustment, contacting the carbonaceous component depressant with the comminuted feed material;
    after addition of the carbonaceous component depressant, contacting the anionic collector with the comminuted feed material;
    after addition of the anionic collector, contacting the frother with the comminuted feed material;
    after step (f) and before step (i), adjusting a pH of the comminuted second fraction to provide a pH ranging from about pH 3.5 to about pH 6.5;
    after pH adjustment, contacting the carbonaceous component depressant with the comminuted second fraction;
    after addition of the carbonaceous component depressant, contacting the anionic collector with the comminuted second fraction;
    after addition of the anionic collector, contacting a frother with the comminuted second fraction.

18. The method of claim 14, wherein the depressant is a sulfonate and is not added in a sufficient amount to depress sulfide flotation and wherein the comminuted feed material comprises gypsum and further comprising:
    contacting the comminuted feed material with a sodium carbonate to clean exposed sulfide mineral surfaces of precipitated gypsum.

19. The method of claim 14, wherein the first and third fractions have a sulfide sulfur content of at least about 6.5 wt. %, wherein the refractory feed material comprises silicates, wherein at least most of the silicates in the refractory feed material are in the fourth fraction, wherein, in step (e), the first fraction comprises about 40% of more of the sulfides in the refractory feed material and no more than about 20% of the carbonaceous preg robbing component and wherein, in step (i), the third fraction comprises about 40% of more of the sulfides in the refractory feed material and no more than about 20% of the carbonaceous preg robbing component.

20. The method of claim 14, wherein step (e) is flash flotation and further comprising:
    after step (e) and before step (f), size separating the second fraction to form oversized and undersized fractions and wherein the oversized fraction is recycled to step (b).

21. The method of claim 14, wherein step (i) is flash flotation and further comprising:
    after step (i), size separating the fourth fraction to form oversized and undersized fractions and wherein the oversized fraction is comminuted in (f).

22. The method of claim 15, wherein, in each of steps (b) and (f), from about 10 to about 250 g/tonne of sulfide activator is added and from about 25 to about 250 g/tonne of polymeric clay dispersant is added.

23. The method of claim 14, wherein, in each of steps (e) and (i), flotation is performed in the presence of from about 1 to about 50 g/tonne of the carbonaceous material depressant and wherein the carbonaceous material depressant is a sulfonate to reduce consumption of the collector and frother.

24. The method of claim 14, wherein the sulfide activator is copper sulfate and wherein the sulfide activator substantially inhibits oxidation of sulfide surfaces exposed during comminution.

25. The method of claim 14, further comprising:
    (j) recovering the gold from the first and third fractions.

26. A method, comprising:
    (a) providing a refractory feed material, the refractory feed material comprising gold, sulfides, a carbonaceous preg robbing component, and a clay;
    (b) comminuting the refractory feed material to form a comminuted feed material having a first size distribution;
    (c) during comminuting, adjusting chemical conditions of the refractory feed material by adding a sulfide activator and a polymeric clay dispersant;
    (d) after the comminuting step (b), contacting the comminuted feed material with a carbonaceous component depressant, collector, and frother;
    (e) floating, in the presence of air, the comminuted feed material, in the presence of the sulfide activator, the polymeric clay dispersant, the collector, the frother, and the carbonaceous component depressant, at a pH ranging from about pH 3.5 to about pH 6.5, and at an Eh ranging from about 25 to about 100 millivolts, to form first and second fractions, the first and second fractions each comprising at least some of the gold and sulfides in the refractory feed material;
    (f) comminuting the second fraction to provide a comminuted second fraction, the comminuted second fraction having a second size distribution finer than the first size distribution;
    (g) during comminuting, adjusting chemical conditions of the second fraction by adding the sulfide activator and polymeric clay dispersant;
    (h) after the comminuting step (f), contacting the comminuted second fraction with the carbonaceous component depressant, collector, and frother; and
    (i) further floating, in the presence of air, the comminuted second fraction, in the presence of the polymeric clay dispersant, the sulfide activator, the collector, the frother, and the carbonaceous component depressant, at a pH ranging from about 3.5 to about pH 6.5, and at an Eh ranging from about 25 to about 100 millivolts, to produce third and fourth fractions, the third fraction comprising at least most of the gold and sulfides in the second fraction, wherein, in each of steps (b) and (f), from about 10 to about 250 g/tonne of sulfide activator and from about 25 to about 250 g/tonne of polymeric clay dispersant are added and wherein, in each of steps (e) and (i), flotation is performed in the presence of from about 1 to about 50 g/tonne of the carbonaceous material depressant.

* * * * *